US008504081B2

(12) United States Patent
Waytena, Jr. et al.

(10) Patent No.: US 8,504,081 B2
(45) Date of Patent: *Aug. 6, 2013

(54) SYSTEMS AND METHODS FOR PROVIDING COMMUNICATIONS SERVICES USING ASSIGNED CODES

(75) Inventors: William L. Waytena, Jr., San Francisco, CA (US); Eric T. Stone, San Francisco, CA (US)

(73) Assignee: Copiamobile, Inc., Scottsdale, AZ (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/741,154

(22) Filed: Apr. 27, 2007

(65) Prior Publication Data

US 2008/0096591 A1  Apr. 24, 2008

Related U.S. Application Data

(63) Continuation-in-part of application No. 11/680,291, filed on Feb. 28, 2007, and a continuation-in-part of application No. 11/550,837, filed on Oct. 19, 2006.

(51) Int. Cl.
*H04M 3/42* (2006.01)
*H04M 15/06* (2006.01)

(52) U.S. Cl.
USPC ............ 455/466; 455/414.1; 379/142.01; 379/201.02

(58) Field of Classification Search
USPC ............ 455/413, 466, 412.2, 550.1, 560, 455/412, 414.1; 379/142, 68, 67.1, 85–88, 379/142.1, 201.02, 216.01
See application file for complete search history.

(56) References Cited

U.S. PATENT DOCUMENTS 5,509,054 A * 4/1996 Garland .................. 379/106.09
6,289,223 B1 9/2001 Mukherjee et al.
(Continued)

FOREIGN PATENT DOCUMENTS

GB 2327571 1/1999
GB 2376608 12/2002
(Continued)

OTHER PUBLICATIONS

Web page entitled "SMS-Kall" available at http/www.smsdial.net.
(Continued)

*Primary Examiner* — Nizar Sivji
(74) *Attorney, Agent, or Firm* — Gordon & Jacobson, PC

(57) ABSTRACT

A communications service (and components thereof) have one or more communication addresses (e.g. short codes, telephone numbers, IM names/domains, IP addresses, etc.) for receiving text-based messages, a service platform for carry out a number of communication services, and a database of registered subscribers. Subscribers access the database preferably through a web-enabled interface. A subscriber associates a selected communications service with a unique alphanumeric code and conveys the alphanumeric code to other individuals as desired. The individual enters the alphanumeric code as part of a text-based message communicated to the communications address of the service. The service includes logic that receives the text-based messages over the diverse messaging formats and processes the text embedded in each message to extract the alphanumeric code therein. The logic accesses the database to identify the subscriber and communication service that is uniquely associated with the particular alphanumeric code received as part of a given text-based message. The logic then controls the service platform to carry out the communication service that is associated with the alphanumeric code and subscriber. The plurality of communications services supported by the service platform and alphanumeric codes preferably include at least one of voice call functions, voice mail functions, text message functions, text broadcast functions, and media delivery functions.

30 Claims, 2 Drawing Sheets

U.S. PATENT DOCUMENTS

| | | |
|---|---|---|
| 6,389,276 B1 * | 5/2002 | Brilla et al. ................ 455/413 |
| 6,760,580 B2 | 7/2004 | Robinson et al. |
| 6,856,809 B2 | 2/2005 | Fostick |
| 6,879,678 B1 | 4/2005 | Lang |
| 7,054,926 B1 | 5/2006 | Abidi et al. |
| 2001/0026609 A1 | 10/2001 | Weinstein et al. |
| 2002/0071539 A1 | 6/2002 | Diament et al. |
| 2003/0227902 A1 | 12/2003 | Lindquist |
| 2004/0240650 A1 * | 12/2004 | Bear et al. ............ 379/142.01 |
| 2005/0277406 A1 * | 12/2005 | Diroo et al. ............. 455/412.2 |
| 2006/0183489 A1 * | 8/2006 | Modeo ...................... 455/466 |
| 2007/0026878 A1 | 2/2007 | Midkiff et al. |

FOREIGN PATENT DOCUMENTS

| | | |
|---|---|---|
| WO | WO 01/41412 | 7/2001 |
| WO | WO 2004/073288 | 8/2004 |
| WO | WO 2005/101858 | 10/2005 |

OTHER PUBLICATIONS

Web page entitled "Command Set for SMS" available at http://www.smsdial.net.
Web page entitled "Web-Kall" available at http://www.smsdial.net.
Web page entitled "Desk-Kall" available at http://www.smsdial.net.
"CISCO IPVC 3500 Series Video Maltpoint Conferencing Unit" Data Sheet, 2004 Cisco Systems, Inc.
Web page entitled "SMS-Kall" available at http/www.smsdial.net, Dated: 2004.
Web page entitled "Command Set for SMS" available at http://www.smsdial.net, Dated: Sep. 15, 2006.
Web page entitled "Web-Kall" available at http://www.smsdial.net, Dated: 2004.
Web page entitled "Desk-Kall" available at http://www.smsdial.net, Dated: 2004.
"CISCO IPVC 3500 Series Video Multipoint Conferencing Unit" Data Sheet, 2004 Cisco Systems, Inc., Dated: 2004.

* cited by examiner

SYSTEMS AND METHODS FOR PROVIDING COMMUNICATIONS SERVICES USING ASSIGNED CODES

CROSS-REFERENCE TO RELATED APPLICATIONS

This application is a continuation-in-part of Ser. No. 11/680,291, filed Feb. 28, 2007, and entitled "Method and System for Centralized Storage of Media and for Communication of Such Media Activated by Real-Time Messaging", the complete disclosure of which is incorporated by reference herein. This application is also a continuation-in-part of Ser. No. 11/550,837, filed Oct. 19, 2006, and entitled "Telecommunication System", the complete disclosure of which is incorporated by reference herein.

BACKGROUND OF THE INVENTION

1. Field of the Invention

This invention relates broadly to communications. More particularly, this invention relates to communication services that are initiated by text messaging or other messaging platforms.

2. State of the Art

Telephone devices such as traditional landline phones and mobile phones include a keypad or dialer that is operated by a user to initiate a conversation with one or more individuals. Mobile phones also typically employ a graphical user interface that allows the user to store and maintain a list of contacts and phone numbers associated therewith. The user interacts with the interface to identify a particular contact and then selectively initiate a conversation with the particularly contact.

Advanced cellular services introduced technology that assisted customers' needs for availability and receipt of instantaneous information. One such technology, known as Short Messaging Service (SMS), enables individuals to send and receive short text messages on mobile phones and other mobile devices (and occasionally even on computers). SMS was developed in Europe in the early 1990s. Initially, SMS was available as part of GSM networks; however, it is now available on a wide range of networks, including CDMA and 3G networks. SMS is a point-to-point communication method whereby an SMS message is transmitted from a wireless phone (or other mobile device or possibly a computer) to a short message service center (SMS-C), which acts as a store and forward system for short messages. The message is forwarded from the SMS-C to the destination phone (or other mobile device or possibly a computer).

The previously incorporated U.S. applications describe new advantageous communications services which can be accessed in a variety of ways. It is the inventors' goal to expand these services in other new and useful ways. In particular, it would be useful to allow people to contact you without revealing your true contact information. For example, if someone wants to be reachable by phone (or email or IM or text message) for a short period of time but not after that period of time, one would ordinarily need to change phone numbers, email addresses, etc. A situation in which this might arise is an online auction or selling something by classified advertisement. When the sale is concluded, it would be desirable to disable the phone number, email or other contact information that was used during the sale. Conversely, some people may find that they need to frequently change contact information but they want all of their contacts to know the new contact information. It would be desirable to effectively forward messages directed to old contact addresses and phone numbers to the new contact addresses and phone numbers, thereby relieving the need to notify all of one's contacts of the new contact information and relieving one's contacts from the need to update their contact lists.

SUMMARY OF THE INVENTION

It is therefore an object of the invention to provide systems and methods for triggering or enabling the transfer of information over a communications network.

It is another object of the invention to provide systems and methods for using assigned codes to trigger or enable the transfer of information over a communications network.

It is a further object of the invention to provide systems and methods for assigning codes to various communications services.

In accord with these objects, which will be discussed in detail below, the systems and methods of the invention include a service provider having one or more communication addresses (e.g. short codes, telephone numbers, IM names/domains, IP addresses, etc.) for receiving text-based messages, a service platform for carry out a number of communication services, and a database of registered subscribers. Subscribers access the database preferably through a web-enabled interface. A subscriber associates a selected communications service with a unique alphanumeric code and conveys the alphanumeric code to other individuals as desired. The individual enters the alphanumeric code as part of a text-based message communicated to the communications address of the service.

According to one aspect of the invention, the service includes logic that receives the text-based messages over the diverse messaging formats and processes the text embedded in each message to extract the alphanumeric code therein. The logic accesses the database to identify the subscriber and communication service that is uniquely associated with the particular alphanumeric code received as part of a given text-based message. The logic then controls the service platform to carry out the communication service that is associated with the alphanumeric code and subscriber.

In the preferred embodiment of the invention, the plurality of communications services supported by the service platform and alphanumeric codes of the present invention include at least one of voice call functions, voice mail functions, text message functions, text broadcast functions, and media delivery functions.

Additional objects and advantages of the invention will become apparent to those skilled in the art upon reference to the detailed description taken in conjunction with the provided figures.

DETAILED DESCRIPTION

As used herein, the term "telecommunication" is generally defined as the transmission and reception of signals over a distance for the purpose of communication. A "telephony device" (or "telephony terminal" or "telephone") is generally defined as a telecommunications device which is used to transmit and receive sound (most commonly voice and speech) across distance. A "communications device" (or "communications terminal") is a device that transmits and receives signals for the purpose of communication.

Figure 1:
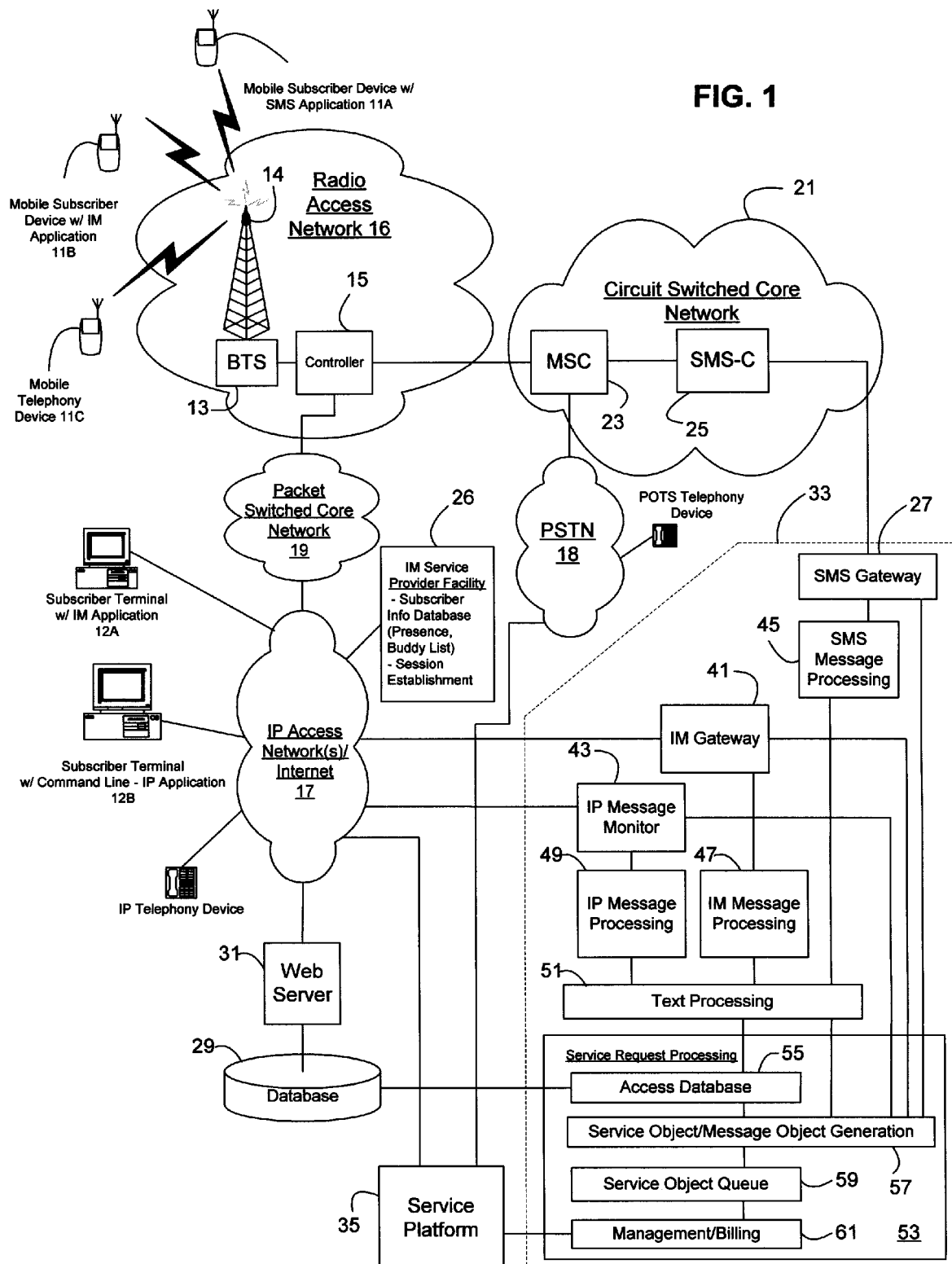
FIG. 1 is a schematic diagram of an embodiment of a communication system in accordance with the present invention.

Turning now to FIG. 1, there is shown a schematic diagram of an exemplary communication system in which the present invention may be embodied. Mobile telephony devices 11A-11C communicate over wireless communication links to a mobile access network 16, which includes a plurality of base stations 13 (one shown) that are operably coupled to controllers 15 (one shown). The controllers 15 are responsible for radio resource allocation to the mobile telephony devices 11A-11C, and for frequency administration and handover between base stations 13. The controller function may be physically located within a base station 13 itself. Each base station 13 includes at least one antenna 14 and a group of one or more radio transmitter-receiver pairs (not shown). Each transmitter-receiver pair operates on a pair of radio frequencies to create a communication channel: one frequency to transmit radio signals to a mobile telephony device 11 and the other frequency to receive radio signals from the mobile telephony device 11. Each base station 13 defines a cell of the mobile access network 16, which is a predetermined volume of space radially arranged around its antenna 14. In order to prevent the radio signals transmitted from one base station from interfering with radio signals transmitted from an adjacent base station, the transmitter frequencies for adjacent base stations are selected to be different so that there is sufficient frequency separation between adjacent transmitter frequencies. In order to reuse the same frequencies, the cellular telecommunication industry has developed a small but finite number of transmitter frequencies and allocation patterns that ensure that adjacent cell sites do not operate on the same frequency. When a mobile telephony device 11 initiates a call connection, control signals transmitted from the local base station 13 cause the frequency agile transponder in the mobile telephony device 11 to operate at the frequency of operation designated for that particular base station. As the mobile telephony device 11 moves from one cell to another, the call connection is handed off to the successive base station and the frequency agile transponder in the mobile telephony device 11 adjusts its frequency of operation to correspond to the frequency of operation of the base station 13 located in the cell in which the mobile telephony device 11 is presently operational.

Fixed or mobile communication terminals 12A, 12B communicate over communication links to the IP access network(s)/Internet 17 as is well known. Such communication can be carried out by a cable modem coupled to a hybrid fiber coax data network, a DSL modem coupled to a DSL access network, or a radio interface coupled to a Wi-Fi or Wi-Max access network. The fixed or mobile communication terminals 12A, 12B can be any of a number of communication devices including personal computers, laptop computers, personal digital assistants, networked kiosks, VoIP phones, traditional phones connected to VoIP gateways, and the like.

The mobile access network 16 interfaces to a packet switched core network 19 and to a circuit switched core network 21. Packet switched traffic (e.g., IP packet data) that originates from (or is destined to) the mobile telephony devices 11A-11C is routed over the packet switched core network 19. Circuit switched traffic (e.g., voice calls, SMS messages) that originates from (or is destined to) the mobile telephony devices 11A-11C is routed over the circuit switched core network 21.

The packet switched core network 19 connects to the Internet 17 and includes functionality for data session management of the mobile telephony devices 11A-11C and for routing packet switched traffic into and out of the packet switched core network 19. In this manner, the packet switched core network enables the mobile telephony devices 11A-11C to connect to Internet-connected devices (e.g., a web server, a VoIP communication terminal, etc.) as needed.

The circuit switched core network 21 includes a mobile switching center (MSC) 23 and an SMS center (SMS-C) 25. Generally, the MSC 23 connects the circuit switched core network 21 to the public switched telephone network 18 and manages and routes circuit switched voice traffic into and out of the circuit switched core network 21. In this manner, the MSC 23 enables the mobile telephony devices 11 to connect to POTS telephony devices that interface to the PSTN 18 as needed.

The SMS-C 25 functions as a centralized store-and-forward device that accepts SMS messages and buffers the received SMS messages until a suitable delivery time (e.g., the destination mobile telephony device 11A is powered on and the location known). The SMS-C 25 also provides an interface in accordance with a communication protocol (e.g., UCP, SMPP, Sema OIS, CIMD2) that allows for communication of SMS messages to and from other cell networks and to and from other external SMS processing devices (e.g., the SMS gateway 27). Preferably, the external SMS processing device(s) is (are) connected to the SMS-C 25 over a wide area network such as the Internet.

Numerous technologies, such as GSM, CDMA, EDGE and W-CDMA technology, can be used to implement the radio access network 16 and the supporting core networks 19 and 21. GSM technologies provide GPRS services which can be used for packet switched applications. 3G CDMA technologies provide code division multiple access technology for packet switched applications. EDGE technology provides enhanced GPRS services. High-speed data applications such as video services and other multimedia services benefit from the increased data capacity provided by the enhanced GPRS services. W-CDMA technology employs wideband code division multiplexing technology to provide high speed packet switched data rates that are suitable for high-speed data applications such as video services and other multimedia services.

The communication system of FIG. 1 supports a number of communication services in response to messages conforming to diverse messaging formats. In the preferred embodiment, the diverse messaging formats include a Short Message Service (SMS) messaging format, an Instant Message (IM) messaging format, and a proprietary IP messaging format.

The SMS messaging format, which is specified by the ETSI organization (documents GSM 03.40 and GSM 03.38), can be up to 160 characters long, where each character is 7 bits according to the 7-bit default alphabet. An eight-bit message format (max 140 characters) can also be used, but this format is usually not viewable by the phones as text messages; instead it is used for data in smart messaging (images and ringing tones) and OTA provisioning of WAP settings. A 16-bit message format (max 70 characters) can also be used for Unicode (UCS2) text messages and is viewable by most phones. There are two ways of sending and receiving SMS messages: by a protocol description unit (PDU) mode or by a text mode. The PDU mode contains not only the text of the message, but also a lot of meta-information about the sender (e.g., the sender's SMS service center, the time stamp, etc). The text mode is just an encoding of the bit stream represented by the PDU mode. Alphabets may differ and there are several encoding alternatives when displaying an SMS message. The most common options are "PCCP437", "PCDN", "8859-1", "IRA" and "GSM". These options are set by the at-command AT+CSCS. An application capable of reading incoming SMS messages can thus use text mode or PDU mode. If text mode is used, the application is bound to (or limited by) the set of preset encoding options. If PDU mode is used, any encoding can be implemented.

Instant messages are generated by applications for carrying out text conversations that are to happen in real-time. Instant message service providers (e.g., AOL Instant Messenger, Yahoo! Messenger, Skype, Google Talk, Windows Messenger, ICQ, etc.) typically maintain a facility 26 that includes a database storing a list of contacts for each subscriber and presence information. The presence information indicates the availability of the contacts. Most instant messaging service providers allow users to set and update their presence information so that peers get notified whenever the user is available, busy, or away. The facility 26 also includes logic that establishes communication sessions between subscribers (or between a subscriber and a user of another provider). The facility 26 typically employs proprietary protocols for maintaining presence information and receiving notifications related thereto (for example, a notification when a user logs-in or comes back from lunch), for managing a session of real-time messages between two or more participants, and for communicating such real time messages between the two or more participants of a given session. The message format for the real-time messages communicated between the participants of a given session is typically proprietary in nature and thus can vary between service providers. Standards-based protocols for instant messaging, such as XMPP and Jingle (defined at http://www.xmpp.org/extensions/xep-0166.html) can also be used.

Subscribers of the service access a database 29. Each subscriber can have the following information associated therewith in the database 29:
  the user name of the subscriber;
  a password and possibly other information for authentication of the subscriber;
  at least one phone number for the subscriber, which can the number assigned to the subscriber's traditional POTS telephony device for home or business purposes, a number assigned to the subscriber's mobile telephony device, an identifier assigned to the subscriber's IP telephony device, or other identifier that is used to establish a voice connection to the subscriber;
  at least one IM screen name/IM Service Provider for the subscriber, which is used to route IM messages and possibly for establishing a voice connection to the subscriber;
  at least one email address for the subscriber;
  a home address for the subscriber; and
  a business address for the subscriber.

According to methods of the present invention which are described in more detail below with reference to FIG. 2, subscribers can associate alphanumeric codes to certain communications services supported by the system. The alphanumeric codes for a given subscriber are unique to that given subscriber. Moreover, the alphanumeric code associated with a given communication service for a subscriber are unique to that given communication service. The associations between the alphanumeric codes and communication services for each given subscriber of the service are stored in the database 29.

Subscriber's access to the database 29 can be accomplished over the Internet with a web server (or application server) 31 that provides an interface therebetween. This configuration allows users to access and update the database 29 (and possibly manage other information) via user interaction with a web browser in communication with the web server (or application server) 31 over the Internet. The web browser can be executing on one of the Internet-connected fixed or mobile communication terminals 12A, 12B. Alternatively, it can be a micro-browser executing on one of the mobile telephony devices 11A-11C. In other embodiments, subscriber access to the database 29 can be realized by other communication means, such as messages directed to the service over any one of the diverse messaging formats supported by the service, interaction with an IVR system managed by the service, and/or other means.

A subscriber conveys one or more of the unique alphanumeric codes to another individual. The subscriber can also convey the short telephone number or short code reserved for the service, the IM name/domain reserved for the service, or other identifier for the service. Such information can be conveyed verbally (for example, when meeting the party at a social gathering or as part of voice call), in a publication either printed or electronic (such as a bulletin board, online forum, classified ads, auctions, etc.), or in an electronic message (such as an email, SMS message or IM message). The individual enters the alphanumeric code as part of a text-based message that is sent to the service. This message (which is referred to below as a Service Request message) is communicated from a user-operated communication device, which can be one of the mobile telephony devices 11 or one of the fixed or mobile communication terminals 12. The Service Request message encapsulates plain text that includes the alphanumeric code uniquely assigned to a given subscriber of the service. The individual that generated the Service Request message (who is referred to below as the "requester") is identified from data that is communicated as part of the Service Request message. For an SMS-type Service Request message, such data can include the ANI of the mobile telephony device that originated the SMS-type Service Request message. For an IM-type Service Request message, such data can include the IM screen name/IM Service Provider of the IM-type Service Request message. For a proprietary-IP-type Service Request Message, such data can include the source IP address of the proprietary-IP-type Service Request message.

The service includes logic 33 that receives Service Request messages over the diverse messaging formats and processes the text embedded in each Service Request message to extract the alphanumeric code therein. The logic 33 accesses the database 29 to identify the subscriber and communication service that is uniquely associated with the particular alphanumeric code received as part of a given Service Request message. The logic 33 then controls a service platform 35 to carry out the communication service that is associated with the alphanumeric code and subscriber.

The service platform 35 can be adapted to carry out a broad range of communication services, such as a "Call Me" service, a "Text Me" service, a "Voicemail Me" service, a "Group Text" service, a "Play" service, a "Record Status" service, and/or a "Follow Service as described below in more detail.

In the illustrative embodiment of the invention, the logic 33 includes an SMS gateway 27 for receiving (and possibly sending) SMS messages in accordance with one or more SMS messaging formats, an IM gateway 41 for receiving (and possibly sending) IM messages in accordance with one or more IM messaging formats, and an IP Message monitor 43 for receiving (and possibly sending) IP messages in accordance with one or more proprietary IP messaging formats.

The SMS Gateway 27 receives incoming SMS messages that are addressed to a reserved telephone number (or reserved short code) for the service and sends outgoing SMS from the reserved telephone number (or reserved short code) of the service. The SMS gateway 27 interfaces to the SMS-C 25 preferably using a communication protocol such as UCP, SMPP, Sema OIS, or CIMD2 that allows for the communication of SMS messages therebetween. The SMS gateway 27 interfaces to an SMS Message Processing block 45 that processes each given incoming SMS message received at the SMS Gateway 27 to extract the text data encapsulated in the given SMS message and passes the extracted text data of to a text processing block 51.

The IM Gateway 41 receives incoming IM messages that are addressed to one or more reserved IM user names for the service. The IM messages can also specify corresponding IM service providers. For example kadoink@gmail.com can be used to identify the reserved IM user name "kaDoink" for the service on the Google Talk IM Service. The IM Gateway 41 also sends outgoing IM messages addressed from such reserved IM user name(s) and service provider(s) if need be. The IM Gateway 41 interfaces to one or more IM Service Provider facilities 26 (e.g., facilities for AOL Instant Messenger, Yahoo! Messenger, Skype, Google Talk, Windows Messenger, ICQ, etc.) to maintain presence information as well as for session establishment for sending/receiving messages to/from subscribers of the one or more facilities 26. Such communication can employ proprietary protocols and/or standardized protocols such as XMPP and Jingle as discussed above. The IM Gateway 41 can carry out protocol translation to allow for interoperability between different IM messaging formats and platforms, if need be. The IM Gateway 41 interfaces to an IM Message Processing block 47 that processes each given incoming IM message received at the IM Gateway 41 to extract the text data encapsulated in the given IM message and pass the extracted text data to the text processing block 51.

The IP Message Monitor 43 receives incoming IP messages that routed to a predetermined IP address and port, and can also send outgoing IP messages that are routed to a predetermined IP address and port. The IP messages can use TCP or UDP packets as a transport mechanism. The message format for the incoming and outgoing IP messages can be proprietary in nature and known only by the two end points. The IP Message Monitor 43 interfaces to an IP Message Processing block 49 that processes each given IP message received at the IP Message Monitor 43 to extract the text data encapsulated in the given IP message and passes the extracted text data to the text processing block 51.

The text processing block 51 analyzes the text data of the message to extract the alphanumeric code therein. The Request Processing block 53 includes block 55 that accesses the database 29 to identify the subscriber and the communication service that is uniquely associated with the particular alphanumeric code extracted by block 51 as part of a given Service Request message. Information pertaining to the subscriber and the communication service information identified by block 55 is output to block 57.

Block 57 generates a service object that specifies the information needed to deliver the communication service identified in block 55 and adds this object to the Object Queue 59.

The Object Queue 59 is a queue of service objects that is preferably processed on a FIFO basis. When selected from the queue, the service object is passed to Management Processing block 61, which cooperates with the service platform 35 and/or one or more of the networks 16-19, 21 to deliver the communication service dictated by the object and preferably bills the subscriber's account for the service.

Block 57 can also cooperate with the SMS Gateway 27 to generate and send an SMS message or to receive one. Block 57 can also cooperate with the IM Gateway 41 to generate and send or receive IM messages. Block 57 can also cooperate with the IP Message Monitor 43 to generate and send or receive IP messages.

In the event that an error occurs in the processing of a given Service Request message (for example, the alphanumeric code therein does not match any entry in the database 29), block 57 (or the other elements of the processing logic 33) can cooperate with the SMS Gateway 27 to generate and send one or more SMS messages that provide an indication of the error. Block 57 (or the other elements of the processing logic 33) can also cooperate with the IM Gateway 41 to generate and send one or more IM messages that provide an indication of the error. Block 57 (or the other elements of the processing logic 33) can also cooperate with the IP Message Monitor 43 to generate and send one or more IP messages that provide an indication of the error.

As stated above, according to the methods of the invention, subscribers can associate unique alphanumeric codes (or "tags") with different communications services. Theses services include a broad range of communication services, such as a "Call Me" service, a "Text Me" service, a "Voicemail Me" service, a "Group Text" service and/or a "Play Media" service as described below in more detail.

Figure 2:
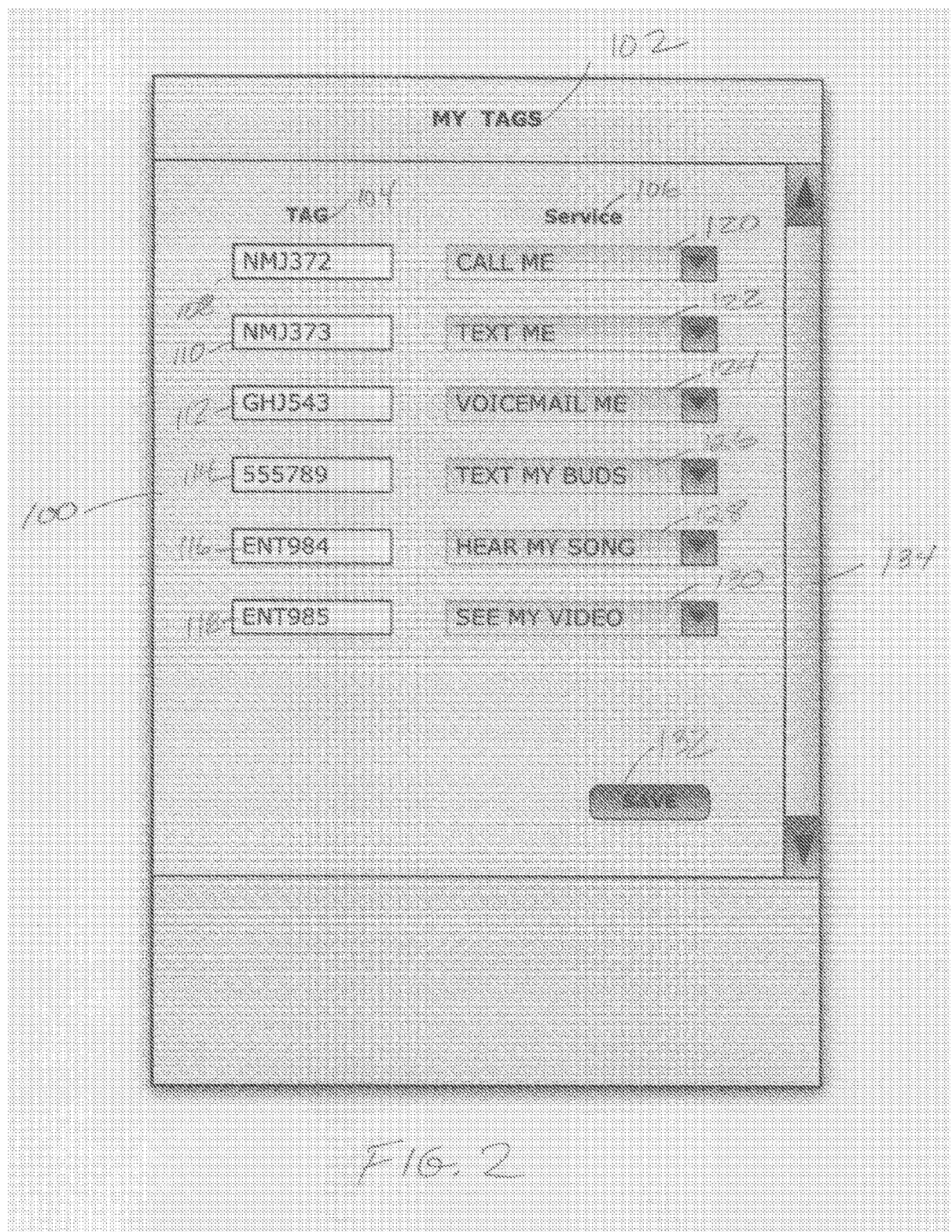
FIG. 2 is an illustrative screen shot of a portion of a user interface according to the invention.

Turning now to FIG. 2, according to the presently preferred embodiment of the invention, a graphical user interface (GUI) 100 is provided whereby subscribers can assign unique alphanumeric codes to various communications services. The GUI may be accessed via any communications device which has a graphical display, a pointing device such as a mouse, trackball or stylus, and means for inputting alphanumeric text. Such devices include computers, smart mobile telephones and other wireless devices. Alternatively, a non-GUI connection can be provided. Such interactive connections include IVR with voice recognition or IVR with DTMF input by the subscriber.

Subscribers access the service in any conventional way such as by entering a name and a password at a web site. Once logged on, the GUI 100 of FIG. 2 may be selected from a plurality of other GUIs which provide other services. As illustrated in FIG. 2, the GUI is entitled "My Tags" 102 and provides two columns: Tag 104 and Service 106. The Tag column includes a plurality of text fields, e.g. 108, 110, 112, 114, 116, 118. The Service column provides a corresponding number of pull down menus, e.g. 120, 122, 124, 126, 128, 130. At the bottom of the interface is a save button 132 and to the right of the interface there is a scroll bar to be used in the event that the subscriber's display cannot display the complete list of Tags and Services.

The text fields in the Tag column are used to enter unique alphanumeric codes. The codes may be automatically generated by the service provider or chosen by the subscriber in much the same was as a user name is chosen with conventional online services, i.e. via trial and error with the service provider appending numbers to the user chosen code to make it unique. Once a code appears in a text field, the pull down menu to the right of the text field is used to select a service which will be associated with the code. In actuality, the code is not just associated with a selected service but is also associated with the subscriber who is accessing the interface 100.

Call-Me Service

As illustrated in FIG. 2, the code "NMJ372" is associated with the "Call Me" service. When a subscriber makes this association, the code "NMJ372" becomes an alias for the subscriber's telephone number. The subscriber may then convey this code to other individuals as desired. Once in receipt of the code, the individual enters the code as part of a Service Request message that is communicated to the service 33 from a communication device (e.g., mobile phone) operated by the individual. The service logic 33 receives the Service Request message as described above. As part of such processing, the Request Processing block 53 accesses the database 29 to identify the subscriber and the "Call Me" communication service that is uniquely associated with the alphanumeric code "NMJ372" received as part of a given Service Request message. The contact telephone number for the subscriber is retrieved from the database 29. The telephone number of the subscriber and the telephone number (ANI) of the requestor of the received Service Request message is output to block 57, which generates a service object that specifies the information needed to deliver the "Call Me" communication service utilizing the telephone number of the subscriber and the telephone number (ANI) of the requestor. This service object is processed by the Management Processing block 61, which cooperates with the service platform 35 and/or one or more of the networks 16-19, 21 to perform the "Call Me" service specified by the service object. In this case, the service platform 35 connects to the ANI of the requester, connects to the contact number of the subscriber (as dictated by the information stored in database 29), and then bridges the two connections together for voice communication therebetween (thus utilizing the service platform as an intermediary conference bridge). These operations are similar to those described in detail in U.S. application Ser. No. 11/550,837.

As part of the call set-up operations, the service logic 33 and service platform 35 can communicate with the subscriber over SMS (or possibly IM or other communication channels) to allow for call screening functionality. In the preferred embodiment, the subscriber is presented with a set of unique codes that allow the subscriber to invoke specific functions for the call (e.g., accept the call, block the call, direct the call to voicemail, send a text message to the requestor) related to the call. The subscriber sends a reply text-based message to the service with one of the unique codes therein. The logic 33 is adapted to wait for the reply message. In the event that the reply message includes the unique code for accepting the call, the service platform 35 provides for voice communication between the two parties as described above. In the event that the reply message includes the unique code for declining the call, the service platform 35 aborts the process for establishing voice communication between the two parties, if started, and possibly generates a message to the requesting party indicating the failure of the call. In the event that the reply message includes the unique code for directing the call to voice mail, the service logic 33 and service platform 35 connect the requestor to the voice mailbox of the subscriber as set forth below with respect to the "Voicemail Me" service. Finally, in the event that the reply message includes the unique code for replying to the call request via a text message, the service logic 33 and service platform 35 forward the reply message to the requestor.

The "Call Me" service is advantageous because neither party to the call will learn the other's phone number and the utility of the code can be removed by the subscriber easily through the interface 100, thereby revoking the permission to call. The removal of the code from the text field 108 destroys the association. Alternatively, selecting a null entry with the pull down menu 120 will delete the association. Moreover, this process is simple to do and efficient as the requestor need only send a text message consisting of the code to the appropriate short code/address of the service provider.

Text Me

As illustrated in FIG. 2, the code "NMJ373" is associated with the "Text Me" service. When a subscriber makes this association, the code "NMJ372" becomes an alias for the subscriber's telephone number for receiving text-based messages. The subscriber may then convey this code to other individuals as desired. Once in receipt of the code, the individual enters the code as part of a Service Request message that is communicated to the service 33 from a communication device (e.g., mobile phone) operated by the individual. The service logic 33 receives the Service Request message as described above. As part of such processing, the Request Processing block 53 accesses the database 29 to identify the subscriber and the "Text Me" communication service that is uniquely associated with the alphanumeric code "NMJ373" received as part of a given Service Request message. The ANI for the subscriber is retrieved from the database 29. The ANI of the subscriber and the text from the received Service Request message (possibly with the subscriber's code stripped out) is output to block 57, which generates a service object that specifies the information needed to deliver the "Text Me" communication service utilizing the ANI of the subscriber and the text from the received Service Request message. This service object is processed by the Management Processing block 61, which cooperates with the service platform 35 and/or one or more of the networks 16-19, 21 to perform the "Text Me" service specified by the service object. In this case, the service platform 35 generates and sends an SMS-message to the ANI of the subscriber. This SMS message includes the text from the received Service Request message. In this manner, the service platform operates as a text message forwarding engine. Similar operations can be used to carry out an "IM Me" service for IM message forwarding.

The "Text Me" service is advantageous because neither party to the call will learn the other's phone number (or messaging address) and the utility of the code can be removed by the subscriber easily through the interface 100, thereby revoking the permission to text. The removal of the code from the text field 108 destroys the association. Alternatively, selecting a null entry with the pull down menu 120 will delete the association. Moreover, this process is simple to do and efficient as the requestor need only send a text message consisting of the code to the appropriate short code/address of the service provider.

Voicemail Me

As illustrated in FIG. 2, the code "GHJ543" is associated with the "Voicemail Me" service. Once this association is made, the subscriber may then convey this code to other individuals as desired. Once in receipt of the code, the individual enters the code as part of a Service Request message that is communicated to the service 33 from a communication device (e.g., mobile phone) operated by the individual. The service logic 33 receives the Service Request message as described above. As part of such processing, the Request Processing block 53 accesses the database 29 to identify the subscriber and the "Voicemail Me" communication service that is uniquely associated with the alphanumeric code "GHJ543" received as part of a given Service Request message. A voice mailbox for the subscriber is identified from system information. Information identifying the voice mailbox of the subscriber and the telephone number (ANI) of the requestor are output to block 57, which generates a service object that specifies the information needed to deliver the "Voicemail Me" communication service utilizing the voice mailbox of the subscriber and the telephone number (ANI) of the requestor. This service object is processed by the Management Processing block 61, which cooperates with the service platform 35 and/or one or more of the networks 16-19, 21 to perform the "Voicemail Me" service specified by the service object. In this case, the service platform 35 places a voice call to the ANI of the requestor and enables the requestor to leave voicemail in the mailbox of a subscriber (preferably through an IVR process as is conventional). The subscriber can access his/her mailbox in any one of many different ways, such as call-in access, web-based access, text message access, IM access or other suitable access mechanism. The subscriber can also be presented with a variety of options regarding the voicemail message (such as forwarding the voicemail message, recording and sending a reply to the voicemail message, calling the originator of the voicemail message, etc.) as described below in more detail with respect to the "voicemail" command.

The "Voicemail Me" service is advantageous because it allows for anonymous call screening without the need to engage in a conversation.

Group Text

As illustrated in FIG. 2, the code "555789" is associated with the "Group Text" service. When a subscriber selects this service from the pull down menu 126, the subscriber is prompted via a dialog box to select a predefined list of recipients (or to define the list of recipients). The recipients can be selected from contacts within the subscriber's contact list or by other means. The ANI of each recipient is specified or otherwise known. These associations are stored in the database 29. When a subscriber makes these associations, the subscriber may then convey this code to other individuals as desired. Once in receipt of the code, the individual enters the code as part of a Service Request message that is communicated to the service 33 from a communication device (e.g., mobile phone) operated by the individual. The service logic 33 receives the Service Request message as described above. As part of such processing, the Request Processing block 53 accesses the database 29 to identify the subscriber and the "Group Text" communication service that is uniquely associated with the alphanumeric code "555789" received as part of a given Service Request message. The ANI for the subscriber as well as the ANI of each recipient associated with the code "555789" are retrieved from the database 29. The ANI of the subscriber, the ANI for the one or more recipients associated with code "555789", and the text from the received Service Request message (possibly with the subscriber's code stripped out) is output to block 57, which generates a service object that specifies the information needed to deliver the "Group Text" communication service utilizing the ANI of the subscriber, the ANI for the one or more recipients, and the text from the received Service Request message. This service object is processed by the Management Processing block 61, which cooperates with the service platform 35 and/or one or more of the networks 16-19, 21 to perform the "Group Text" service specified by the service object. In this case, the service platform 35 generates and sends SMS-messages to the ANI of the subscriber and to the ANI for the one or more recipients. This SMS message includes the text from the received Service Request message. In this manner, the service platform operates as a group text message forwarding engine. Similar operations can be used to carry out a "Group IM" service for group IM message forwarding.

The "Group Text" service is advantageous because it provides for anonymous text message broadcasting, which is useful in group situations where the subscriber and recipients would like to maintain privacy.

Play Media

As illustrated in FIG. 2, the codes "ENT984" and "ENT985" are associated with two different media delivery services, which are labeled "Hear My Song" and "See My Video", respectively. The "Hear My Song" service involves the playing or streaming of audio content. The "See My Video" service involves the streaming of video content. When one of the media delivery services is selected (such as "Hear My Song" from pull down menu 128 or "See My Video" from pull down menu 130), the subscriber must identify the location of the file containing the media content to be delivered. The media file may have been previously uploaded to subscriber space on a server or the subscriber may be prompted to upload the file when the service is selected from the pull down menu. Preferably a wide variety of file formats are supported. Such files can include, for example, wav, aiff, mp3, wma or aac audio files for the "Hear My Song" service, or jpeg, mpeg4 or flash video files for the "See My Video" service. It may be desirable to convert uploaded files to a more efficient format before streaming the files to other subscribers. These associations are stored in the database 29. When a subscriber makes these associations, the subscriber may then convey this code to other individuals as desired. Once in receipt of the code, the individual enters the code (for example, the code "ENT984") as part of a Service Request message that is communicated to the service 33 from a communication device (e.g., mobile phone or IM-enabled device) operated by the individual. The service logic 33 receives the Service Request message as described above. As part of such processing, the Request Processing block 53 accesses the database 29 to identify the subscriber and the "Hear My Song" communication service that is uniquely associated with the alphanumeric code "ENT984" received as part of a given Service Request message. The audio file(s) associated with the particular alphanumeric code "ENT984", or a reference thereto, are retrieved from the database 29. The audio file(s) (or references) along with the telephone number (ANI), or the IM address or other address, of the requestor of the received Service Request message are output to block 57, which generates a service object that specifies the information needed to deliver the particular "Hear My Audio" communication service utilizing the audio files associated with the "ENT984" code and the telephone number (ANI) or other address of the requester. This service object is processed by the Management Processing block 61, which cooperates with the service platform 35 and/or one or more of the networks 16-19, 21 to perform the "Hear My Audio" service specified by the service object. In this case, the service platform 35 places a voice call to the ANI (or other address) of the requestor and plays the audio file over the voice call. Alternatively, the service platform 35 can set up a data connection to the address of the requestor and stream the audio content thereto. Similar operations are performed to carry out the "See My Video" service for the code "ENT985". In the case, the service platform 35 can set up a data connection to the address of the requestor and stream the media content thereto. These operations are similar to those described in detail in U.S. application Ser. No. 11/680,291.

The "Hear My Song" and "See My Video" services are advantageous because they allow for anonymous delivery of media.

Record Status

The "Record Status" service supports the recording of audible status messages by subscribers of the service. A particular subscriber assigns a unique alphanumeric code to this service. These associations are stored in the database 29. A subscriber enters the code as part of a Service Request message that is communicated to the service 33 from a communication device (e.g., mobile phone or IM-enabled device) operated by the individual. The service logic 33 receives the Service Request message as described above. As part of such processing, the Request Processing block 53 accesses the database 29 to identify the ANI (or other identifier) of the subscriber that is uniquely associated with the received code. The service platform 35 connects to the ANI of the subscriber and enables the subscriber to record an audible status message (preferably through an IVR process as is conventional). The subscriber can possibly be required to provide a password (or carry out other authentication operations) before recording the audible status message. The subscriber can also be presented with a variety of options regarding the audible status message (such as forwarding the audible status message to other subscribers, etc.). In the preferred embodiment, the service logic 33 assigns a code to the recorded audible status message. This code (which is referred to below as an <audio status object identifier>) together with the subscriber ID code assigned to the subscriber can be used to refer to the audible status message for subsequent operations carried out by the subscriber and/or other users, for example, the "Follow" command as described below in more detail. A subscriber can possibly update his/her recorded audible status message as needed by repeated invocation of the "record status" command. The subscriber can convey his/her ID code and the audio status object identifier code to other individuals as desired.

Follow

The "Follow" service supports the distribution of audible status messages recorded by subscribers of the service. A particular subscriber assigns a unique alphanumeric code to this service. The code is also associated with an audio status message recorded by the subscriber. These associations are stored in the database 29. When a subscriber makes these associations, the subscriber may then convey this code to other individuals as desired. Once in receipt of the code, the individual enters the code as part of a Service Request message that is communicated to the service 33 from a communication device (e.g., mobile phone or IM-enabled device) operated by the individual. The service logic 33 receives the Service Request message as described above. As part of such processing, the service logic 33 accesses the database 29 to identify the audio status message that is uniquely associated with the received code. The service platform 35 is controlled to connect to the telephone number (or other identifier) of the requester. The audio status message specified by the Service Request message is then played (or possibly streamed) over the connection.

2-Part Codes

As described above, the service assigns unique codes to voicemail messages recorded through processing of the "Voicemail Me" service. In the preferred embodiment, the unique code assigned to a given voicemail message includes two parts with a predetermined delineator therebetween (e.g., <part1>.<part2> with the period as a delineator). The first part (e.g., <part1>) is a user ID code (e.g., subscriber ID code) designating the requestor that generated the voicemail message. The second part (e.g., <part2>) is a system generated code for the particular voicemail message. The two part code can be used to refer to the voicemail message for subsequent operations carried out by the subscriber. For example, the 2-part code can be forwarded to another user in an email, SMS message or IM message. The recipient user can then access the voicemail message utilizing the 2-part code, for example, by issuing a "play" command as described above with the 2-part code for the voicemail message included therein. Alternatively, the subscriber can interact with the system to record a reply to the recorded voicemail message. This recorded reply can be assigned a 2-part code and returned to the requestor that generated the voicemail message. In this case, the first part (e.g., <part1>) is the subscriber ID code designating the subscriber that generated the reply message. The second part (e.g., <part2>) is a system generated code for the particular reply message. The two part code can be used to refer to the reply message for subsequent operations carried out by the subscriber. For example, the 2-part code can be forwarded to another user in an email, SMS message or IM message. The recipient user can then access the reply message utilizing the 2-part code, for example, by issuing a "play" command as described above with the 2-part code for the reply message included therein.

A similar two-part code format can be used to specify the media content used in conjunction with a "Play" service. In this case, the first part (e.g., <part1>) of the code is the <subscriber ID code> designating the subscriber and the second part (e.g., <part2>) of the code refers to particular media content. The media content may have been previously uploaded to subscriber space on a server or referenced by other means. The association between the two part code and the particular media content is stored in the database 29. The two part code can be used to refer to the media content for subsequent operations carried out by the subscriber. For example, the 2-part code can be forwarded to another user in an email, SMS message or IM message. The recipient user can then access the media content utilizing the 2-part code for the media content.

A similar two part code format can also be used to refer to audio status messages recorded by subscribers in conjunction with the "Record Status" service. In this case, the first part (e.g., <part1>) is the <subscriber ID code> designating the originating subscriber of the audio status message, and the second part (e.g., <part2>) is a system generated code for the audio status message (e.g., "status"). The two part code can be used to refer to the audio status message for subsequent operations carried out by the subscriber. For example, the 2-part code can be forwarded to another user in an email, SMS message or IM message. The recipient user can then access the audio status message utilizing the 2-part code for the audio status message.

Unique alphanumeric codes can also be associated with particular communications services. For example, various media files such as podcasts, videos, music, ring tones, etc. can be associated with unique alphanumeric codes that are published to all subscribers, e.g. via one or more web pages. Some of the content may be free to subscribers and other content may be accessed only after a fee is billed to the subscriber's account. Exemplary codes are preferably structured in a logical order to make content easily retrievable by subscribers. For example, "author.title", "publisher.publication", "band.song" ordering can be used. These two-part code structures allow for subscriber feedback to the "author", "publisher", "band", etc. The feedback can be provided by addressing a communication (voice call, text, voice mail, etc.) to "author", "publisher", "band", etc. These two-part code structures also allow subscribers to fish for a media file by guessing its name, e.g. "rollingstones.satisfaction" or "tikibar.episode21". Moreover, codes which are available to a subscriber are searchable.

In yet another aspect of the invention, the codes and tags described herein can have descriptors associated therewith. Such descriptors can be provided by subscribers (or possibly generated by the system in response to a questionnaire or other means). A query interface is provided that enable users to identify tags and codes that relate to descriptors provided as part of a particular query input. The query interface can be provided by a web-accessible interface, a text message command, an IM command, an IVR system or other suitable interface. A user can access the query interface from a mobile phone or other communication device. It is contemplated that subscribers will supply descriptors that self-describe themselves. In this manner, the query interface will enable users to locate and retrieve codes and tags to connect to a person, a pizza store in your area, or anything with a phone in a unique way, and thus provides an enhanced version of a phone book.

There have been described and illustrated herein several embodiments of systems and methods for delivering communications services. While particular embodiments of the invention have been described, it is not intended that the invention be limited thereto, as it is intended that the invention be as broad in scope as the art will allow and that the specification be read likewise. For example, the peer-to-peer communication operations described herein can be extended to multiple party conferencing. Parties can be added to a multiple-party conference utilizing any suitable mechanism, including dial-in methods to a central service and dial-out methods from the service. For dial-out methods, the text-based message processing described herein can be used to add or join users to the multiparty conference. It will therefore be appreciated by those skilled in the art that yet other modifications could be made to the provided invention without deviating from its spirit and scope as claimed.

What is claimed is:

1. An apparatus for delivering communications services to users comprising:
    a service platform for carrying out a plurality of communication services, wherein said plurality of communication services are different from one another and involve at least one form of communication selected from the group consisting of telephony, text message communication, instant message communication, and streaming media communication;
    a database storing a telephone number uniquely assigned to a particular user;
    means for generating an alphanumeric code that is uniquely assigned to the particular user, wherein the alphanumeric code is different from said telephone number assigned to the particular user;
    interface means, operably coupled to the database, for interacting with the particular user to define an association between said alphanumeric code and a user-selected one of the plurality of communications services, and storing in said database information representing the association between said alphanumeric code and the user-selected one communication service;
    means for receiving a text-based message from a requesting party, the text-based message including said alphanumeric code; and
    a control block, coupled to said database and said service platform, for controlling said service platform to initiate the user-selected one communication service that is associated with said alphanumeric code included in the received text-based message as dictated by the information stored in said database;
    wherein said plurality of communication services include a calling service; and
    wherein, in the event that said alphanumeric code is associated with the calling service by said interface, the control block is configured to initiate the calling service as associated with said alphanumeric code included in the received text-based message by controlling the service platform to carry out a number of operations including establishing a connection to the requesting party, establishing a connection to the telephone number stored in the database for the particular user associated with the alphanumeric code included in the received text-based message, and bridging the two connections together for voice communication there between.

2. An apparatus according to claim 1, wherein:
    said text-based message is an SMS-type message.

3. An apparatus according to claim 1, wherein:
    said text-based message is an IM-type message.

4. An apparatus according to claim 1, wherein:
    said text-based message is an IP-type message.

5. An apparatus according to claim 1, wherein:
    the service platform communicates with the particular user associated with the alphanumeric code included in the received text-based message to allow for call screening.

6. An apparatus according to claim 5, wherein:
    the communication between the service platform and the particular user includes a set of unique codes that allow the particular user to invoke specific functions for the call.

7. An apparatus according to claim 1, wherein:
    wherein said plurality of communication services further include a messaging service; and
    wherein, in the event that said alphanumeric code is associated with the messaging service by said interface, the control block is configured to initiate the messaging service as associated with said alphanumeric code included in the received text-based message by controlling the service platform to generate and send a text-based message to the telephone number stored in the database for the particular user associated with the alphanumeric code included in the received text-based message, wherein content of the text-based message sent to the particular user includes content from the received text-based message.

8. An apparatus according to claim 1, wherein:
    wherein said plurality of communication services further include a group messaging service; and
    wherein, in the event that said alphanumeric code is associated with the group messaging service by said interface, the control block is configured to initiate the group messaging service as associated with said alphanumeric code included in the received text-based message by controlling the service platform to generate and send text-based messages to a set of recipients associated with the alphanumeric code included in the received text-based message, wherein content of the text-based message sent to the set of recipients includes content from the received text-based message.

9. An apparatus according to claim 1, wherein:
    wherein said plurality of communication services further include a voice mailbox service; and
    wherein, in the event that said alphanumeric code is associated with the voice mailbox service by said interface, the control block is configured to initiate the voice mailbox service as associated with said alphanumeric code included in the received text-based message by controlling the service platform carry out a number of operations including establishing a connection to the requesting party, recording a voicemail message provided by the requesting party, and storing the recorded voicemail message in the mailbox of the particular user associated with the alphanumeric code included in the received text-based message.

10. An apparatus according to claim 9, further comprising:
    logic for assigning a unique code to the voicemail message, the unique code referring to the voicemail message for subsequent operations carried out by the particular user.

11. An apparatus according to claim 10, wherein:
the unique code assigned to a given voicemail message comprises a two-part code having a first part and a second part, the first part designating the requesting party that provided the voicemail message and the second part is a system generated code for the particular voicemail message.

12. An apparatus according to claim 1, wherein:
wherein said plurality of communication services further include a media access service; and
wherein, in the event that said alphanumeric code is associated with the media access service by said interface, the control block is configured to initiate the media access service as associated with said alphanumeric code included in the received text-based message by controlling the service platform to carry out a number of operations including establishing a connection to the requesting party and playing or streaming media content over the connection to the requesting party, wherein the media content is associated with the alphanumeric code included in the received text-based message.

13. An apparatus according to claim 1, wherein:
wherein said plurality of communication services further include a record status service; and
wherein, in the event that said alphanumeric code is associated with the record status service by said interface, the control block is configured to initiate the record status service as associated with said alphanumeric code included in the received text-based message by controlling the service platform to establish a connection to the particular user associated with the alphanumeric code included in the received text-based message and record an audible status message provided by the particular user.

14. An apparatus according to claim 13, further comprising:
means for assigning a unique code to the status message, the unique code for referring to the status message for subsequent operations carried out by the subscriber and/or other users.

15. An apparatus according to claim 14,
the unique code assigned to a given status message comprises a two-part code having a first part and a second part, the first part designating the user that generated the status message and the second part being a system generated code.

16. An apparatus according to claim 1, wherein:
said alphanumeric code is assigned to the particular user by said apparatus.

17. An apparatus according to claim 1, wherein:
said alphanumeric code is assigned based in part on input from the particular user.

18. An apparatus according to claim 1, further comprising:
means for deleting from said database said information representing the association between said alphanumeric code and the user-selected one communication service.

19. An apparatus according to claim 1, wherein:
said first interface means is a graphical user interface.

20. An apparatus according to claim 19, wherein:
said graphical user interface includes at least one pull down menu for selecting among the plurality of communications services.

21. An apparatus according to claim 20, wherein:
said graphical user interface includes at least one text entry field associated with said at least one pull down menu.

22. An apparatus according to claim 1, wherein:
said first interface means is an IVR interface.

23. A method for delivering a plurality of communications services to users comprising:
storing in a database a telephone number assigned to the particular user;
generating a unique alphanumeric code for a particular user, wherein the unique alphanumeric code is different from the telephone number for the particular user;
interacting with the particular user to associate the unique alphanumeric code with a user-selected one of the plurality of communications services, wherein said plurality of communication services are different from one another and involve at least one form of communication selected from the group consisting of telephony, text message communication, instant message communication, and streaming media communication;
storing in said database information representing the association between the alphanumeric code and the user-selected one communication service;
receiving a text-based message from a requesting party, the text-based message including said alphanumeric code; and
initiating the user-selected one communication service that is associated with the alphanumeric code included in the received text-based message as dictated by the information stored in said database;
wherein said plurality of communication services include a calling service; and
wherein, in the event that said alphanumeric code is associated with the calling service by said interface, the calling service as associated with said alphanumeric code included in the received text-based message is initiated by a number of operations including establishing a connection to the requesting party, establishing a connection to the telephone number stored in the database for the particular user associated with the alphanumeric code included in the received text-based message, and bridging the two connections together for voice communication therebetween.

24. A method according to claim 23, wherein:
said text-based message is an SMS-type message.

25. A method according to claim 23, wherein:
said text-based message is an IM-type message.

26. A method according to claim 23, wherein:
said text-based message is an IP-type message.

27. A method according to claim 23, wherein:
said plurality of communications services further include at least one of voice mail functions, text-based message functions, text broadcast functions, and media access functions.

28. A method according to claim 23, wherein:
said unique alphanumeric code is machine generated.

29. A method according to claim 23, wherein:
said unique alphanumeric code is assigned based in part on input from the particular user.

30. A method according to claim 23, wherein:
the interacting is provided by a graphical user interface.

* * * * *